United States Patent Office 2,879,024
Patented Mar. 24, 1959

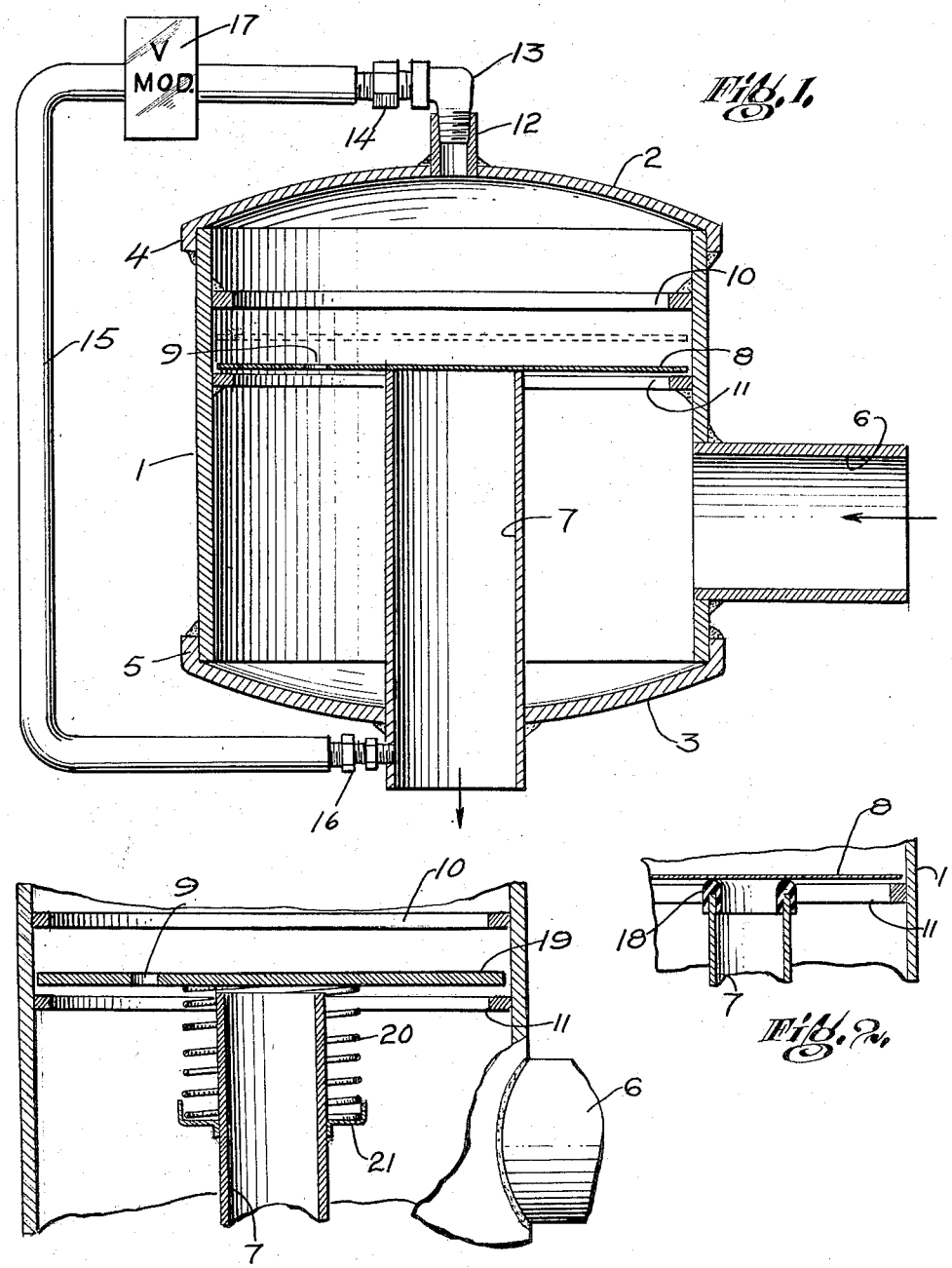

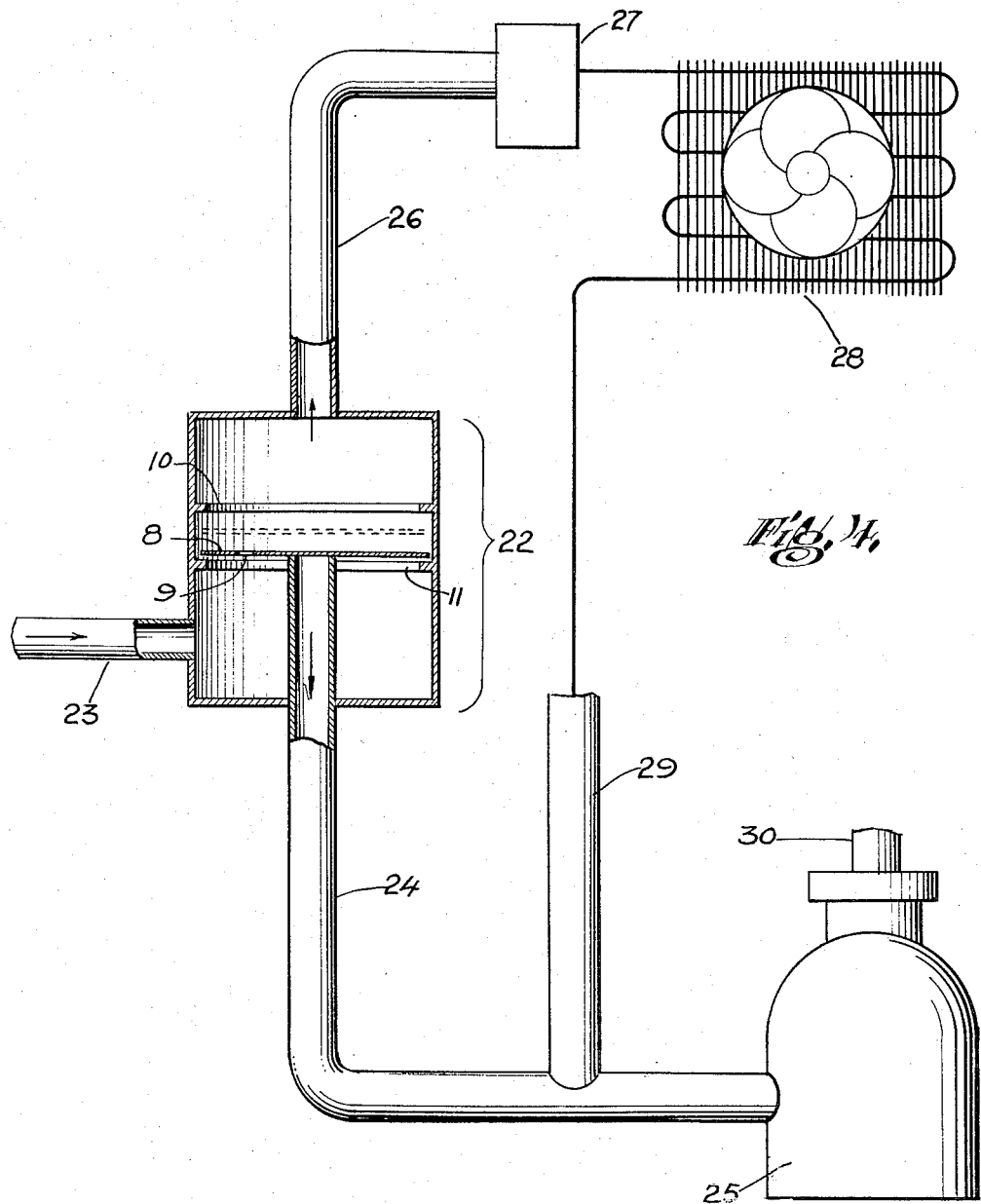

2,879,024

VALVE CONSTRUCTION FOR REFRIGERATING SYSTEMS

Hyman Malkoff, Levittown, Pa., assignor to Kramer Trenton Company, Trenton, N.J., a corporation of New Jersey Application November 26, 1954, Serial No. 471,309

1 Claim. (Cl. 251—44)

This invention relates to valve construction for refrigerating systems. The valve is of the type commonly known as "booster," which is characterized by large capacity and operative association with a smaller "pilot" valve that controls its functioning.

An object of the invention is to provide a booster valve which may be constructed of light weight and low cost parts, largely of standard form and material, thereby greatly reducing the weight, size, and production expense which are characteristic of booster valves now on the market.

Another object is to provide such a valve which is operative under conditions of very low pressure differential on opposed sides of its opening and closing element or, in other words, under the influence of slight pressure drop across the valve.

Another object is to provide such a valve in which the opening and closing element is a floating disc as distinguished from a piston.

Another object is to provide such a valve in which the disc is formed and arranged to permit restricted fluid flow therethrough and around the perimeter thereof.

Another object is to provide such a valve in which the disc cooperates directly with the valve outlet.

Another object is to provide such a valve which includes means for limiting the movement of the disc to modulate flow through the valve.

Another object is to provide such a valve of which the inlet and outlet ports may be very large to enhance the functional capacity.

Another object is to produce such a valve which eliminates the requirement for spring action.

Another object is to provide such a valve which eliminates the necessity of incorporating means for adjusting the limitation of movement of the opening and closing element.

A further object is to provide certain improvements in the form, construction, material, and arrangement of the several parts whereby the above named and other objects inherent in the invention may be efficiently attained.

In brief summary, the invention comprehends the construction of a booster type valve that is composed of light, inexpensive material, such as sheet metal tubing and stampings, thereby avoiding comparatively heavy castings and machined parts; which employs a floating disc as its opening and closing element; which eliminates the requirement of spring action; which may have inlet and outlet ports of large size; which operates under the influence of very small pressure differentials due to the light weight of the disc; and which is admirably suited to installation in the low pressure side of refrigerating systems.

Practical embodiments of the invention are shown in the accompanying drawings, in which Fig. 1 represents a vertical central section through the valve, with its pilot diagrammatically indicated and its conduit connections in elevation;

Fig. 2 represents a detail vertical section, partly in elevation, of a modification;

Fig. 3 represents a detail vertical section, showing another modification; and

Fig. 4 represents diagrammatically, partly in elevation and partly in section, the installation of a modified form of the valve in a refrigerating system having provision for hot gas defrosting.

Commercially available booster valves commonly have a body consisting of a heavy casting which is internally machined to receive a piston that is spring biased and tapered to cooperate wtih a valve seat or opening in another casting in which are also formed the inlet and outlet ports as well as one connection for the pilot valve of which the other connection is in the body casting. The said ports and connections are bored and tapped, and the whole structure is characterized by great size, weight, and expense in fabrication labor.

The present invention is calculated to eliminate the above mentioned features of previous booster valves while providing even better functioning.

Referring to Fig. 1 of the drawings, the body of the valve casing is denoted by 1 and is preferably composed of heavy metallic tubing, e.g. iron or steel. Upper and lower caps or covers 2, 3, which may be stamped to the desired shape from sheet iron or steel, are formed with peripheral flanges 4, 5, fitted to embrace the ends of the tubular body 1 and be suitably secured thereto, as by soldering or welding.

The valve inlet 6 consists likewise of metallic tubing with its inner end entering an aperture in one side of the body portion and being fixed in position, by soldering, welding, or in other desired manner. The end of the inlet should be curved to conform to the body.

The valve outlet 7 is composed of similar material, and it lies in a central aperture formed in the lower cap 3, from which it projects both inwardly and outwardly, with solder or other appropriate means holding it in place.

The inner or upper end of the outlet 7 serves as a valve seat and, for cooperation therewith, there is provided a circular disc 8 composed of stiff or rigid material such, for instance, as brass or stainless steel, which functions as the valve opening and closing element. The diameter of the disc is slightly less than the inside diameter of the body portion 1 in order to leave a clearance therebetween for such a flow of fluid as may be desirable, as will be hereinafter explained; and a small hole or vent 9 may also be formed in the disc for a like purpose. It is desirable that the clearance between the discs and the body portion be the practicable minimum for the purpose of economy in the size of the above mentioned pilot valve. Annular limit stops 10, 11, are positioned within the body portion 1, as by solder or welding; stop 10 being located a selected distance above the inner or upper end of outlet 7, and stop 11 being located at the said end of the outlet; whereby the extent of movement of the disc 8 is restricted, and jamming is prevented. The upper surface of stop 11 should be slightly below the outlet 7 so that tight seating of the disc when in closed position is assured, while the perimeter of the discs is limited in its downward movement. It will be observed that the disc 8 is adapted to float or move freely between the stops 10, 11, as distinguished, for instance, from being guided by a stem or the like.

Cap or cover 2 is centrally apertured to receive a sleeve 12 that is soldered or otherwise properly secured therein; which sleeve, in turn, receives one end of a pipe elbow 13 that has a binding fit or other suitable sealing connection therewith. A union 14, or the like, connects elbow 13 with a metallic conduit 15 which extends outside of the body portion 1 to the outer or lower end of outlet 7 with which it communicates through an appropriate connection indicated generally by 16.

In the conduit 15 is positioned a pilot valve that is diagrammatically represented at 17 and may, for example, be of the open and shut type solenoid actuated, or of the modulating type. It should here be mentioned that the combined flow capacity of the space around the perimeter of the disc 8 and the hole or vent 9 is less than the capacity of the pilot valve 17.

Referring to the operation or functioning of the booster valve, assuming the pilot valve to be of the open and shut type, and further assuming that conditions in the system (e.g. refrigerating) in which the valves are installed call for the closing of the booster valve; the pilot valve 17 will close and the flow therethrough from the space in the booster valve above disc 8 will cease. This will equalize the pressures above and below the disc because of leakage around the disc and through hole or vent 9. Thus the disc 8 will be drawn to closing position on the outlet 7 due to its own weight and the fact that the pressure within the outlet 7 is lower than that surrounding it and above the disc.

When now, conditions in the system require resumption of flow through the booster valve, the pilot valve will open and begin to evacuate fluid from that portion of the booster valve above disc 8 because the pressure there is the same as at the inlet 6 of the booster valve while the outlet side of the pilot valve is in communication with the lower pressure existing at the booster valve outlet 7. Since, as previously noted, the capacity of the pilot valve is greater than the combined flow capacity of the space around the edge of disc 8 and the hole or vent 9, the pressure above the disc will become less than the pressure therebelow and the disc will rise from its seat on outlet 7 to open the booster valve and permit flow therethrough. The upward movement of the disc will be limited by the stop 10, and it will remain in open position as long as the pilot valve 17 remains open. As the surface area of the disc 8 is large in relation to its thickness and weight only a small pressure differential (as little as two tenths of a pound per square inch) across the same is necessary to maintain it in open position, i.e. sufficient to support its weight.

If the pilot valve 17 be assumed to be of the modulating type, e.g. a hold back valve responsive to the pressure at its discharge, the operation or functioning of the booster valve will be as already described with the exception that the pressure above the disc 8 will be such as to maintain the latter in some position or positions between the stops 10 and 11, as indicated in broken lines in Fig. 1, i.e. neither fully open nor fully closed, thus modulating flow through the booster valve. Such a hold back valve is well known to this industry and available on the open market. Its essential function is to throttle or control the flow of fluid therethrough so as to reduce the pressure thereof to a degree not higher than that at which the valve has been adjusted to close.

The exact size of the hole or vent 9 for best functioning is apt to vary under different circumstances, but can readily be determined by trial. In some cases this leakage will not be needed as the flow around the periphery of disc 8 will be adequate. Similarly, the relationship of the internal cross-sectional area of outlet 7 to that of body portion 1 may vary under different circumstances. A ratio of one to ten has been found to be generally satisfactory.

From the foregoing it will be evident that this invention is adaptable to various systems in the operation of which a pressure differential is established as, for instance, by the compressor of a refrigerating system. Due to the large surface area of the disc 8 as compared with its thickness and weight, the pressure differential thereacross requisite to raise and maintain it in open position is very slight. This is a matter of much importance in certain installations, including the suction side of refrigerating systems wherein a pressure drop of even two pounds can cause notable decrease in efficiency, especially of the compressor which is a constant volume device the effective output of which lessens as the rarification of the gas flowing thereto increases.

Fig. 2 shows a modification in which the inner or upper end of the outlet 7 is fitted with a rim seat 18 composed of appropriate material such as "Teflon" or nylon. This has the advantages of improving the seal and reducing wear.

Fig. 3 illustrates another modification in which the opening and closing disc, here marked 19, is thicker and heavier than the disc 8 of Figs. 1 and 2, and an expansion coil spring 20 based on a bracket 21 soldered or otherwise affixed to inlet 7 is provided as a counter-poise to the weight of the disc 19.

In Fig. 4 is presented an adaptation of the booster valve to the suction side of refrigerating apparatus having hot gas defrosting means, in which the booster valve cooperates with a hold back valve and a reevaporator.

Here the booster valve is shown diagrammatically and denoted generally by 22, but it will be understood that its construction is as shown in Fig. 1. Its inlet is connected by conduit 23 to the outlet of the system's evaporator (not shown), while the valve outlet communicates by conduit 24 with the intake or suction side of the compressor 25. The pilot valve opening in the top of the booster valve is connected by a conduit 26 with the inlet of a hold back valve that is represented diagrammatically at 27, and the outlet of which communicates with the inlet of a reevaporator 28 that has its outlet connected by a conduit 29 with the suction conduit 24. The discharge 30 of the compressor is connected through the usual condenser and receiver (not shown) with the inlet of the evaporator (not shown) of the system, and the said discharge is also directly connected with the evaporator for the function of hot gas defrosting; all as is well understood in this industry and calls for neither drawing nor description, it being sufficient to refer by way of illustration to U.S. Patent No. 2,530,440, issued November 21, 1950. The combined flow capacity of the space around the perimeter of the disc 8 and the hole or vent 9 therethrough is less than the capacity of hold back valve 27.

In the operation of this system, during refrigerating cycles the refrigerant returning from the evaporator through conduit 23 is mainly in gaseous form and, as the space above disc 8 will to an extent be evacuated by the hold back valve so as to cause the pressure therein to be less than the pressure below the disc, the latter will rise from its seat on the valve outlet and permit the refrigerant to flow from conduit 23 through conduit 24 to the intake of compressor 25.

When a defrosting cycle is initiated, the refrigerant flowing from the evaporator through conduit 23 will be mainly in liquid phase. It will pass through hole or vent 9 and around disc 8 and then through conduit 26 to hold back valve 27. The latter will now throttle the flow and thereby reduce its capacity to less than the combined flow capacity of hole or vent 9 and the peripheral space around the disc 8. Therefore, the pressure above the disc will become greater than the pressure therebelow and the disc will seat on the booster valve outlet to inhibit flow through conduit 24. In this setting of the valve, the liquid refrigerant will be revaporized by the combined action of the pressure reducing hold back valve 27 and the reevaporator 28, to then traverse conduits 29 and 24 for entry at the compressor intake in desired gaseous phase. To insure fully satisfactory performance, the hole or vent 9 and the space around the periphery of the disc 8 should be of sufficient size to completely feed the reevaporator 28 with refrigerant during defrosting cycles.

It will be understood that various changes may be resorted to in the form, material, construction, and arrangement of the several parts without departing from the spirit or scope of the invention; and, hence, I do not intend to be limited to details herein shown or described except as the same may be included in the claim or be required by disclosures of the prior art.

What I claim is:

A booster type valve construction such as is adapted for installation in the low side of compression type refrigerating systems and for automatic functional control by a separate but operatively connected pilot valve having its own inlet and outlet comprising, a hollow casing having an inlet and an outlet, the outlet being formed with an inwardly extending tube, and a disc positioned within the casing above the inner end of the outlet tube and effective at all times to divide the hollow casing into upper and lower portions, the said disc being unattached to the valve casing and adapted freely to float into contact with and also a variable distance out of contact with said tube under the influences of gravity and fluid pressures within the casing portions above and below the disc and within the outlet tube to permit full or modulated flow through the valve and also to prevent any flow therethrough in the same direction, both the inlet and outlet opening into the portion of the hollow casing below the disc, and the disc fitting loosely within the casing to provide restricted flow space for equalization of fluid pressure above and below the disc to allow for its movement into contact with the outlet tube to prevent flow through the valve, the said booster valve outlet being also formed with an outwardly extending tube portion, in combination with an automatic pilot valve provided with its own inlet and outlet relatively small in flow capacity as compared with the inlet and outlet of the booster valve but greater in flow capacity than the space btween the loosely fitting disc and the casing, said pilot valve being a distinct unit but having its inlet connected with the portion of the hollow casing above the floating disc for affecting the pressure condition therewithin and its outlet connected with the outwardly extending portion of the booster valve outlet tube to be affected by the pressure condition therewithin.

References Cited in the file of this patent

UNITED STATES PATENTS

| | | |
|---|---|---|
| 263,251 | Tobey | Aug. 22, 1882 |
| 501,437 | Pierce | July 11, 1893 |
| 685,928 | Nethery | Nov. 5, 1901 |
| 914,886 | Schreidt | Mar. 9, 1909 |
| 1,146,012 | Mason | July 13, 1915 |
| 1,325,508 | Cockburn | Dec. 23, 1919 |
| 1,633,217 | Littlefield | June 21, 1927 |
| 2,177,980 | Gaul | Oct. 31, 1939 |
| 2,632,303 | Smith | Mar. 24, 1953 |

FOREIGN PATENTS

| | | |
|---|---|---|
| 5,530 | Germany | of 1878 |
| 21,143 | Great Britain | of 1895 |
| 528,404 | France | Aug. 16, 1921 |